United States Patent
Wu et al.

(10) Patent No.: US 9,534,612 B2
(45) Date of Patent: Jan. 3, 2017

(54) CONTROL METHOD AND CONTROL SYSTEM OF FAN

(71) Applicant: DELTA ELECTRONICS, INC., Kuei San, Taoyuan Hsien (TW)

(72) Inventors: Jen-Hao Wu, Taoyuan Hsien (TW); Wei-Shun Huang, Taoyuan Hsien (TW); Tai-Yu Chen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 414 days.

(21) Appl. No.: 13/842,852

(22) Filed: Mar. 15, 2013

(65) Prior Publication Data
US 2014/0030091 A1   Jan. 30, 2014

(30) Foreign Application Priority Data
Jul. 24, 2012   (TW) .............................. 101126532 A (51) Int. Cl.
*F04D 27/00*   (2006.01)
*F04D 27/02*   (2006.01)

(52) U.S. Cl.
CPC .......... *F04D 27/004* (2013.01); *F04D 27/001* (2013.01); *F04D 27/00* (2013.01); *F04D 27/0261* (2013.01)

(58) Field of Classification Search
CPC .. F04D 27/004; F04D 27/0261; F04D 27/001; F04D 27/00; G11B 5/556

USPC ............ 318/400.43, 459, 500; 417/42, 44.1; 324/207.16
See application file for complete search history.

(56) References Cited

U.S. PATENT DOCUMENTS

| | | | | |
|---|---|---|---|---|
| 6,307,336 B1 * | 10/2001 | Goff | ........................ | H02P 6/085 318/400.09 |
| 7,092,196 B2 * | 8/2006 | Eaton | ..................... | G11B 5/556 324/207.16 |
| 2004/0251988 A1 * | 12/2004 | Sharma | .............. | G11C 13/0004 333/172 |
| 2006/0104822 A1 * | 5/2006 | Hahn | ...................... | H02P 6/085 417/42 |
| 2008/0143313 A1 * | 6/2008 | Tang | ..................... | F04D 27/004 323/299 |
| 2010/0119386 A1 * | 5/2010 | Krishnamoorthy | ... | F04D 27/001 417/353 |

* cited by examiner

*Primary Examiner* — Bryan Lettman
*Assistant Examiner* — Connor Tremarche
(74) *Attorney, Agent, or Firm* — Muncy, Geissler, Olds & Lowe, P.C.

(57) ABSTRACT

A control method of a fan comprises steps of: detecting a rotational speed of a blade and a rotor position of the blade; generating a control signal according to the rotational speed and a predetermined rotational speed; obtaining a Back-EMF waveform according to the control signal, the rotational speed, the rotor position and a waveform; adjusting the phase of the Back-EMF waveform; and outputting a switch control signal.

13 Claims, 10 Drawing Sheets

CONTROL METHOD AND CONTROL SYSTEM OF FAN

CROSS REFERENCE TO RELATED APPLICATIONS

This Non-provisional application claims priority under 35 U.S.C. §119(a) on Patent Application No(s). 101126532 filed in Taiwan, Republic of China on Jul. 24, 2012, the entire contents of which are hereby incorporated by reference.

BACKGROUND OF THE INVENTION

Field of Invention

The invention relates to a control method and a control system and, in particular, to a control method and a control system of a fan.

Related Art

A fan is commonly used for the heat dissipation. When a fan is applied to a client system, it usually will be increased or decreased in the number of blades according to the different requirements of the client system, and also the rotational speed of the fan will be controlled and driven by a control chip or apparatus, so that the rotational speed of the fan can be properly adjusted to fit the actual operation conditions of the client system.

Figure 1:
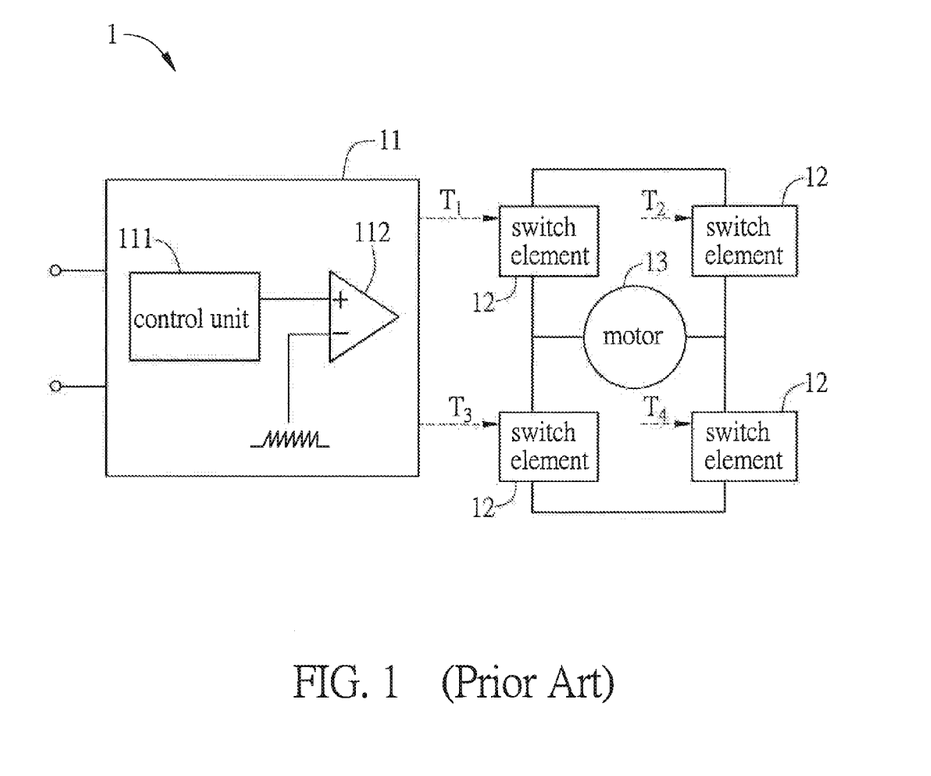
FIG. 1 is a schematic diagram showing the architecture of a conventional fan.
Figure 2A:
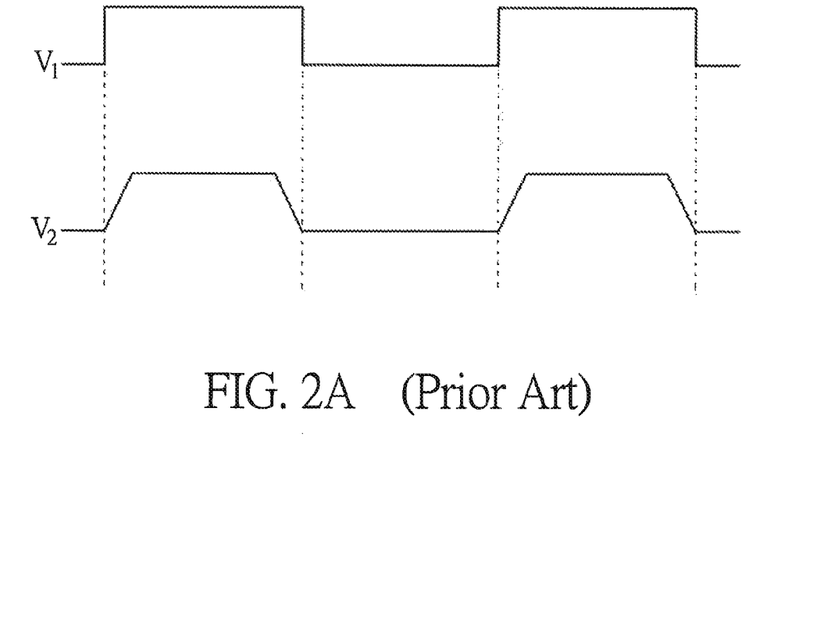
FIG. 2A is a schematic diagram of two waveforms of the conventional switch control signal.
Figure 2B:
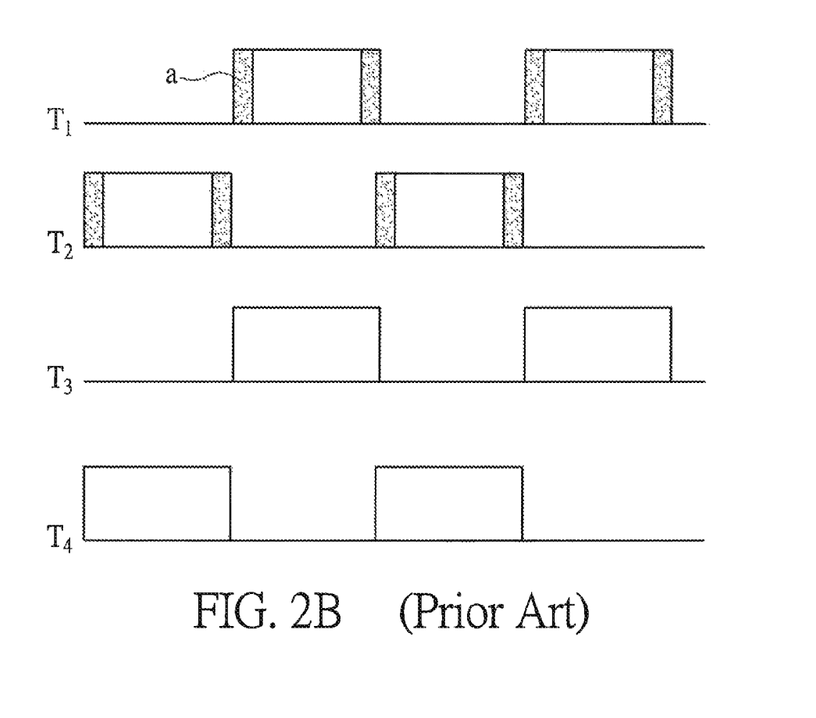
FIG. 2B is a schematic diagram of the conventional switch signals.

FIG. 1 is a schematic diagram showing the architecture of a conventional fan. The fan in FIG. 1 is instanced as a DC brushless fan. The fan 1 includes a control system outputting four switch signals $T_1$~$T_4$ to four switch elements 12 for switching the phase. The four switch elements 12 are connected to a coil of a motor 13. The control system 11 includes a control unit 111 and a comparator 112. The control unit 111 outputs a switch control signal to the comparator 112, and the comparator 112 compares the control signal and a triangle wave to output the switch signals $T_1$~$T_4$. FIG. 2A is a schematic diagram of two waveforms of the conventional switch control signal, and FIG. 2B is a schematic diagram of the conventional switch signals. Conventionally, the common driving method of the fan is hard-switching method which is shown by the switch control signal $V_1$ in FIG. 2A. However, the hard-switching method easily causes larger vibrations. Therefore, in order to reduce vibrations, another driving method, i.e. soft-switching method, is used, which is shown by the switch control signal $V_2$ in FIG. 2A. In FIG. 2B, the switch signals $T_1$~$T_4$ are generated according to the switch control signal $V_2$ of the soft-switching method. The regions a in FIG. 2B denote the portion of the soft-switching.

Figure 3:
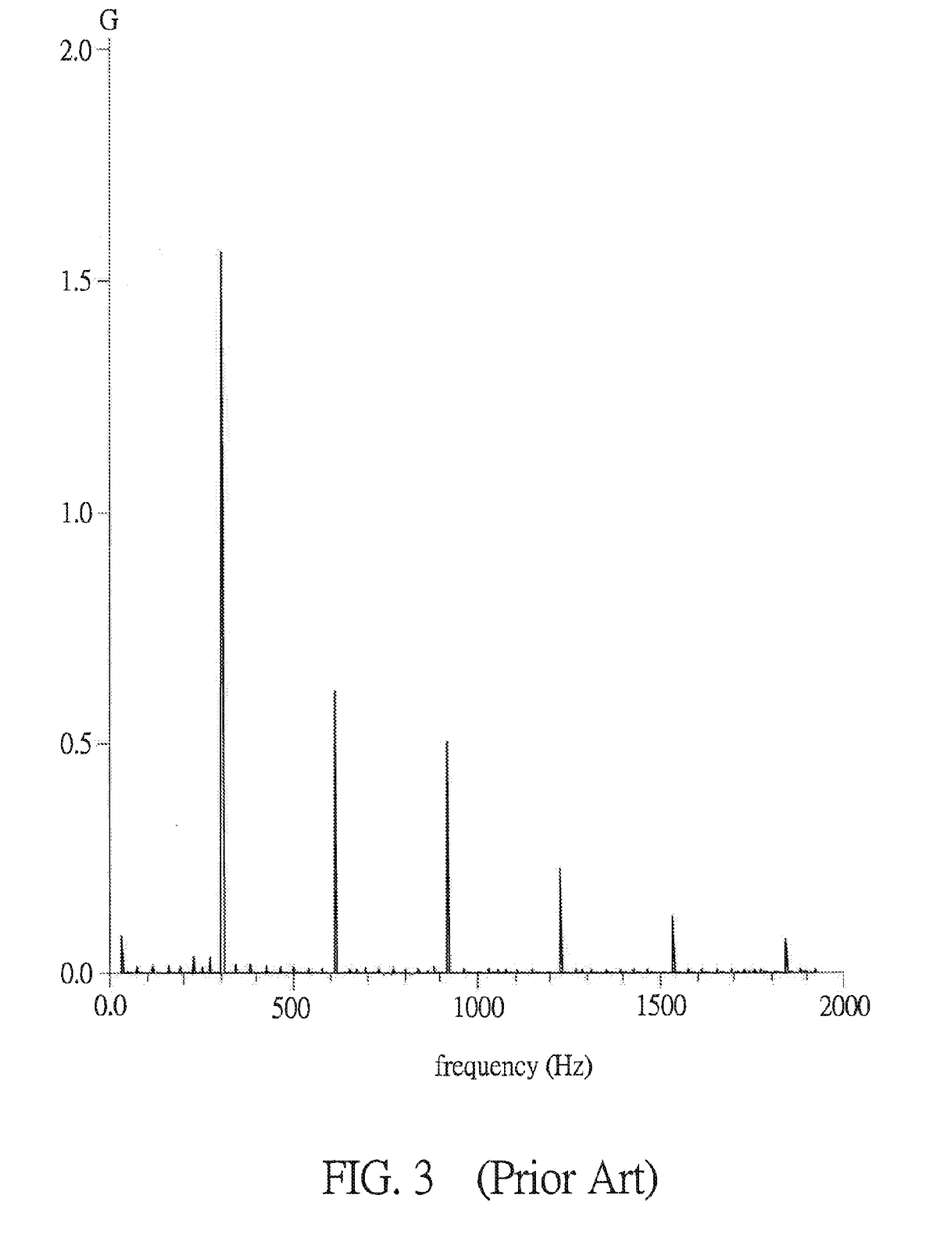
FIG. 3 is a schematic diagram of a vibration spectrum of a conventional fan.

FIG. 3 is a schematic diagram of a vibration spectrum of a conventional fan, wherein the abscissa axis represents the frequency of the rotational speed while the ordinate axis represents the amount of the vibration. FIG. 3 is obtained by transforming the vibration of the fan with a Fourier transform, and the vibration level can be known from FIG. 3. From FIG. 3, it can be seen that the largest vibration level of the conventional fan is larger than 1.5G, and therefore the vibration amount can not be effectively decreased even if the soft-switching method is used to drive the fan.

Otherwise, mechanism design is mostly used for solving the vibration problem of the fan. For the mechanism design, for example, several anti-vibration pads can be added or the mechanical resonance point can be changed to reduce the vibration. However, the frequency multiplication effect caused by the motor can not be overcome by the mechanism design. Besides, the mechanism design will increase the cost and also can not effectively solve the vibration problem.

Therefore, it is an important subject to provide a control method and a control system of a fan that can decrease the fan's vibration under the current driving circuit and architecture for enhancing the efficiency and decreasing the electric pressure.

SUMMARY OF THE INVENTION

In view of the foregoing subject, an objective of the invention is to provide a control method and a control system of a fan that can decrease the fan's vibration for enhancing the efficiency and decreasing the electric pressure so that the life cycle of the product can be extended.

To achieve the above objective, a control method of a fan according to the invention comprises steps of: detecting a rotational speed of a blade and a rotor position of the blade; generating a control signal according to the rotational speed and a predetermined rotational speed; obtaining a Back-EMF waveform according to the control signal, the rotational speed, the rotor position and a waveform; adjusting the phase of the Back-EMF waveform; and outputting a switch control signal.

In one embodiment, the rotational speed and the predetermined rotational speed are compared with each other to generate the control signal.

In one embodiment, the control signal is for the increasing effect.

In one embodiment, the control signal is for the decreasing effect.

In one embodiment, the waveform is derived from a motor.

In one embodiment, the motor generates a first sine-like wave signal, and the control method further comprises: a voltage-transforming unit receiving and adjusting the first sine-like wave signal to output a second sine-like wave signal; an analog-to-digital converting unit generating a plurality of sampling signals according to the second sine-like wave signal; the analog-to-digital converting unit storing the sampling signals in a data table; and generating the waveform according to the data table In one embodiment, the voltage-transforming unit has a first resistance and a second resistance.

In one embodiment, the control method further comprises: adjusting the values of the first and second resistances according to an output voltage of the voltage-transforming unit.

In one embodiment, the sampling signals are generated according to the positive half-cycle of the second sine-like wave signal in the step of generating a plurality of sampling signals according to the second sine-like wave signal by the analog-to-digital converting unit.

In one embodiment, in the step of adjusting the phase of the Back-EMF waveform, the Back-EMF waveform is compared with a standard Back-EMF waveform so that the phase of the Back-EMF waveform is adjusted as the same as the phase of the standard Back-EMF waveform.

In one embodiment, the control method further comprises: generating a switch signal according to the switch control signal and a triangle wave.

To achieve the above objective, a control system of a fan according to the invention comprises a detection module, a control module and a Back-EMF module. The detection module detects a rotational speed of a blade and a rotor position of the blade. The control module is electrically connected to the detection module and generates a control signal according to the rotational speed and a predetermined rotational speed. The Back-EMF module is electrically connected to the control module and the detection module, receives the rotational speed, the rotor position and the control signal to generate a Back-EMF waveform, and adjusts the phase of the Back-EMF waveform to output a switch control signal.

In one embodiment, the control system further comprises a waveform-generating module electrically connected to the Back-EMF module and outputting a waveform to the Back-EMF module.

In one embodiment, the waveform-generating module comprises a voltage-transforming unit and a microcontroller. The voltage-transforming unit receives and adjusts a first sine-like wave signal generated by a motor, and outputs a second sine-like wave signal. The microcontroller is electrically connected to the voltage-transforming unit, includes an analog-to-digital converting unit and a data table. The analog-to-digital converting unit generates a plurality of sampling signals according to the second sine-like wave signal, and stores the sampling signals in the data table.

In one embodiment, the voltage-transforming unit has a resistance, a second resistance and a comparator. The first resistance is electrically connected to the inverting input node of the comparator, and the second resistance is electrically connected to the inverting input node and output node of the comparator.

In one embodiment, the analog-to-digital converting unit generates the sampling signals according to the positive half-cycle of the second sine-like wave signal.

In one embodiment, the voltage-transforming unit outputs an output voltage.

In one embodiment, the Back-EMF module generates the Back-EMF waveform according to the rotational speed, the rotor position, the waveform and the control signal.

In one embodiment, the control system further comprises a comparator, which is electrically connected to the Back-EMF module, and receives the switch control signal and compares the switch control signal and a triangle wave to output a switch signal.

As mentioned above, according to the control method and control system of the fan of the invention, the Hall sensor of the detection module detects the rotational speed and rotor position of the blade, and then the rotational speed is compared with the predetermined rotational speed to generate the control signal for the increasing effect, decreasing effect or unchanged effect. Then, the Back-EMF module obtains a Back-EMF waveform according to the control signal, the rotational speed, the rotor position and the waveform, and adjusts the phase of the Back-EMF waveform to output a switch control signal. Besides, the comparator compares the switch control signal and a triangle wave to output the switch signal for switching the switch elements.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 4:
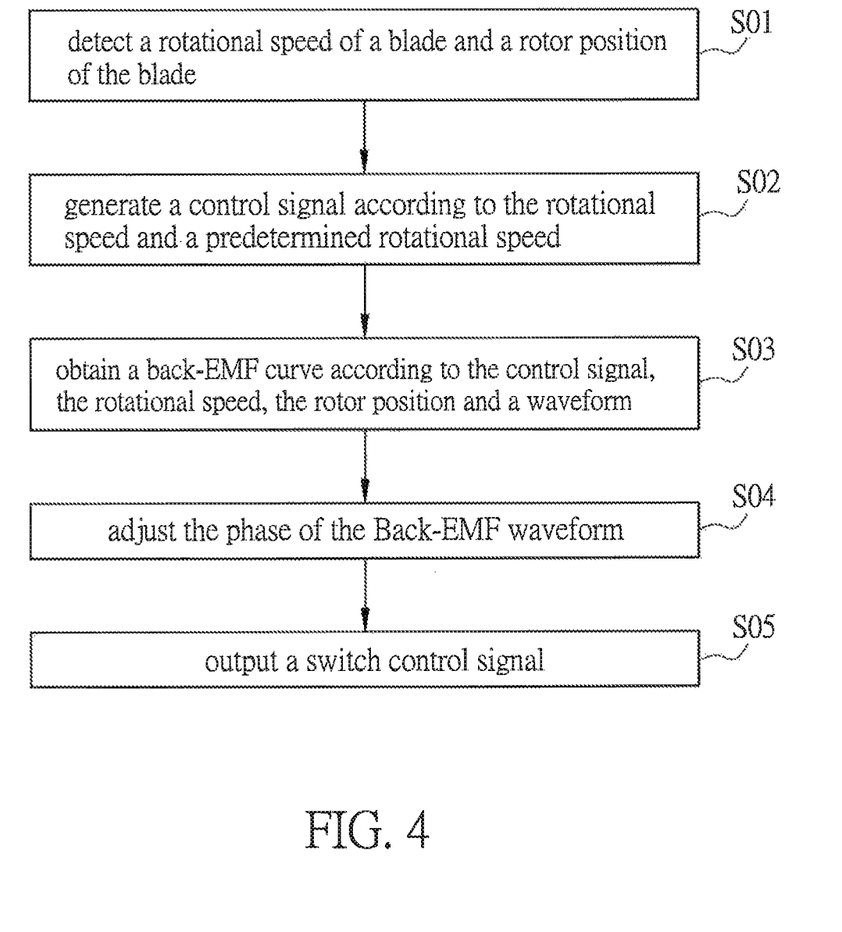
FIG. 4 is a flow chart of a control method of a fan according to a preferred embodiment of the invention.
Figure 5:
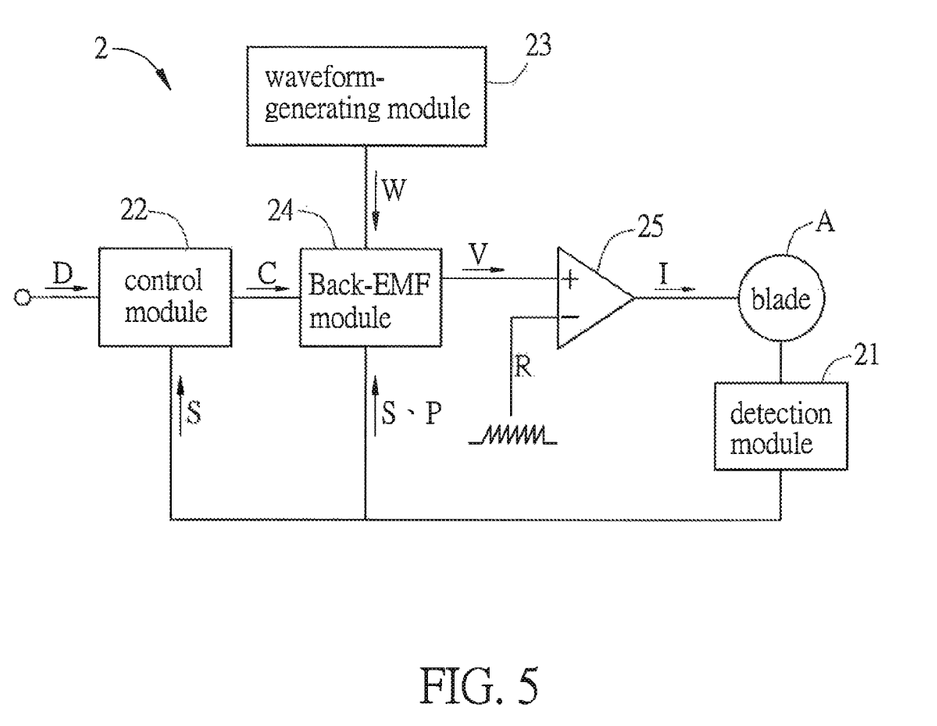
FIG. 5 is a schematic diagram of a control system of a fan according to a preferred embodiment of the invention.

FIG. 4 is a flow chart of a control method of a fan according to a preferred embodiment of the invention, and FIG. 5 is a schematic diagram of a control system of a fan according to a preferred embodiment of the invention. To be noted, the fan of this embodiment is instanced as a single-phase DC brushless fan, but this invention is not limited thereto. The control method of the fan includes the steps S01 to S05.

The step S01 is to detect a rotational speed S of a blade A and a rotor position P of the blade A. In detail, the rotor position P of the blade A can be detected by a detection module 21, and then the rotational speed S of the blade A can be obtained by the calculation. The detection module 21 includes a Hall sensor, which can sense the magnetic field variation for obtaining the rotor position and rotational speed of the blade A.

The step S02 is to generate a control signal C according to the rotational speed S and a predetermined rotational speed D. A control module 22 compares the rotational speed S and the predetermined rotational speed D to determine the difference therebetween, and then generates the control signal C according to the difference. The control signal C can be a control signal for the increasing effect or decreasing effect, and when the rotational speed S is substantially equal to the predetermined rotational speed D, the control signal C can be generated for the unchanged effect. In this embodiment, the control module 22 is a PI controller for example, generating the control signal C according to the rotational speed S and the predetermined rotational speed D.

Then, the step S03 is to obtain a Back-EMF curve (waveform) according to the control signal C, the rotational speed S, the rotor position P and a waveform W. A waveform-generating module 23 (such as a computer as an embodiment) generates the waveform W from a motor, and then outputs the waveform W to a Back-EMF module 24. In detail, the induced electromotive force of the motor coil measured by an oscilloscope is transmitted to the waveform-generating module 23, and then the waveform-generating module 23 digitalize the analog data to obtain the waveform W, which can be a prototype of the Back-EMF waveform for example. Besides, the cycle of the Back-EMF waveform can be obtained by the rotational speed S and the rotor position P, and the peak value of the Back-EMF waveform also can be obtained by the control signal C and the rotational speed S. Therefore, the Back-EMF module 24 can obtain the Back-EMF waveform by the control signal C, the rotational speed S, the rotor position D and the waveform W.

Figure 6:
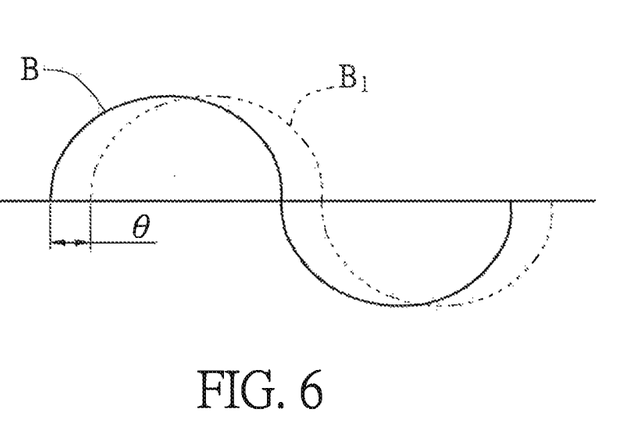
FIG. 6 is a schematic diagram of the Back-EMF waveform and the standard Back-EMF waveform.

The step S04 is to adjust the phase of the Back-EMF waveform. In this embodiment, the Back-EMF module 24 compares the Back-EMF waveform and a standard Back-EMF waveform to adjust the phase of the Back-EMF waveform and then make it substantially the same as the phase of the standard Back-EMF waveform. For example, if the phase of the standard Back-EMF waveform is ahead of the phase of the Back-EMF waveform, the phase of the Back-EMF waveform is adjusted forwards so that the two phases can be synchronous. Oppositely, if the phase of the standard Back-EMF waveform is behind the phase of the Back-EMF waveform, the phase of the Back-EMF waveform is adjusted backwards so that the two phases can be synchronous. Besides, if the phase of the standard Back-EMF waveform is substantially equal to the phase of the Back-EMF waveform, the phase of the Back-EMF waveform needn't be adjusted. Moreover, adjusting the phase of the Back-EMF waveform also can ensure that the voltage is ahead of the current for maintaining the inductive operation. FIG. 6 is a schematic diagram of the Back-EMF waveform and the standard Back-EMF waveform of an embodiment of the invention. In FIG. 6 for example, the phase of the Back-EMF waveform B is ahead of the phase of the standard Back-EMF waveform $B_1$, so the phase of the Back-EMF waveform B needs to be adjusted. Supposing the phase of the Back-EMF waveform B differs from the phase of the standard Back-EMF waveform $B_1$ by θ, the phase of the Back-EMF waveform B is adjusted backwards so that the two phases can be synchronous. To be noted, the invention is not limited to the value of θ, and the case of phase advance or phase lag. In different embodiments, with different motors, the phase angle θ will change accordingly.

By referring to FIGS. 4 and 5, the step S05 is to output a switch control signal V. The Back-EMF module 24 outputs the switch control signal V to a comparator 25 according to the Back-EMF waveform that has been adjusted in phase.

Figure 7:
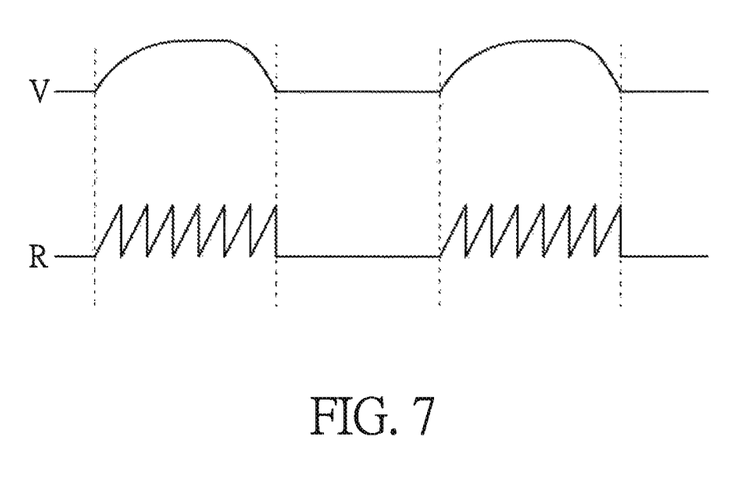
FIG. 7 is a schematic diagram of the switch control signal and a triangle wave according to the invention.

FIG. 7 is a schematic diagram of the switch control signal and a triangle wave of this embodiment of the invention. By referring to FIGS. 5 and 7, the comparator 25 generates a switch signal I according to the switch control signal V and a triangle wave R. The comparator 25 outputs the switch signal I to the blade A for switching at least a switch element (not shown). To be noted, the control system 2 can output four switch signals to control four switch elements. Or, the control system 2 can output two switch signals, and the two switch signals are used to generate two complementary signals outputted by two driving stages, so that four switch signals are obtained for controlling four switch elements.

Figure 8:
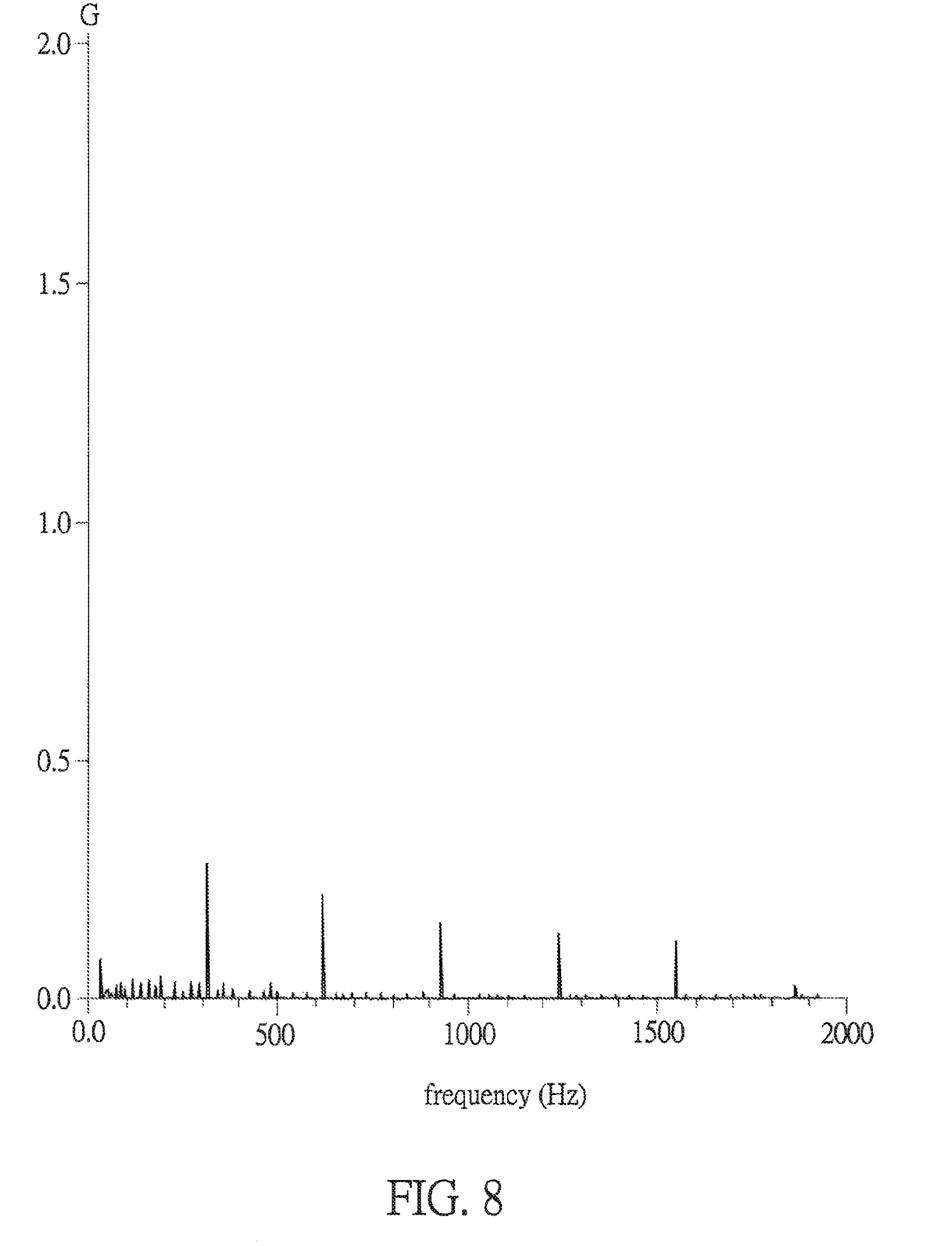
FIG. 8 is a schematic diagram of a vibration spectrum of a fan according to an embodiment of the invention.

FIG. 3 is a schematic diagram of a vibration spectrum of a conventionally fan, and FIG. 8 is a schematic diagram of a vibration spectrum of a fan according to an embodiment of the invention. By the comparison between FIG. 3 and FIG. 8, it can be seen that the vibration amount of the fan of the invention is far less than that of the conventional fan, and the vibration amount of the invention is about one fifth of the conventional vibration amount. Therefore, the control method of the fan of the invention can effectively reduce the vibration amount of the fan.

Figure 9:
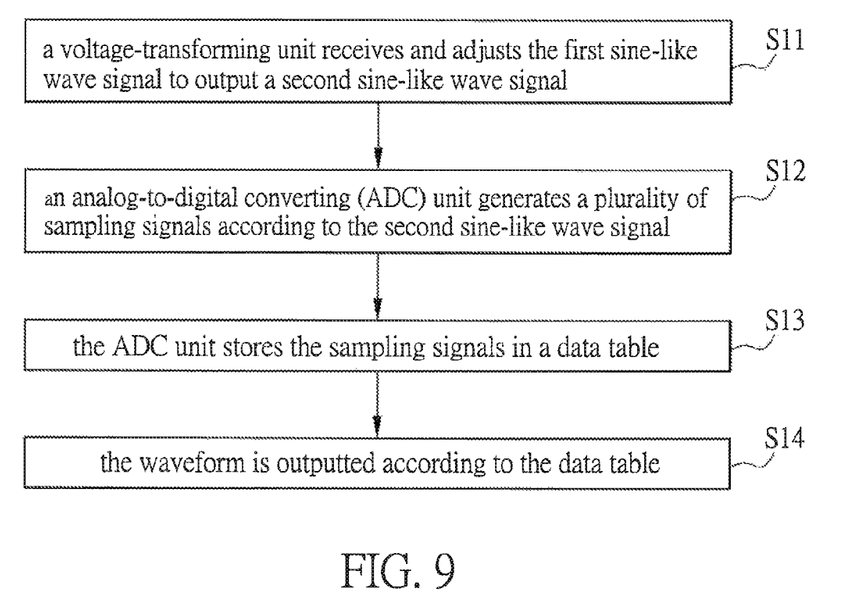
FIG. 9 is a flow chart of a control method of a fan according to another preferred embodiment of the invention.

FIG. 9 is a flow chart of a control method of a fan according to another preferred embodiment of the invention. The control method of this embodiment is approximately the same as that of the above embodiment, and the difference therebetween is the generation way of the waveform W. The control method of this embodiment further includes the steps S11 to S14. To be noted, the following illustration is just for the steps S11 to S14, and the remaining steps are the same as those of the above embodiment, and therefore they are not described here for concise purpose. Besides, the following illustration could be clearly understood by referring to FIG. 10, a schematic diagram of a waveform-generating module.

Figure 10:
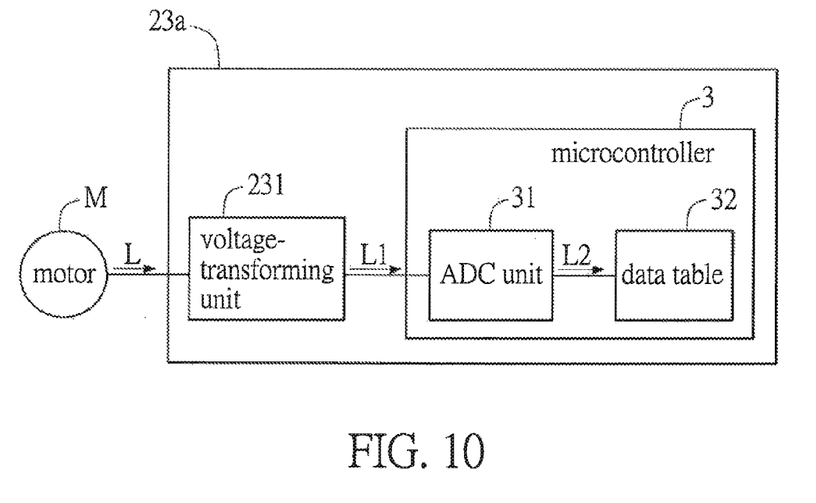
FIG. 10 is a schematic block diagram of the waveform-generating module according to an embodiment of the invention.

In FIG. 10, the waveform-generating module 23a includes a voltage-transforming unit 231 and a microcontroller 3. The voltage-transforming unit 231 is electrically connected to a motor M of a fan A and the microcontroller 3. The microcontroller 3 includes an analog-to-digital converting (ADC) unit 31 and a data table 32. The motor M generates a first sine-like wave signal L, which is the Back-EMF of the motor M.

Figure 11A:
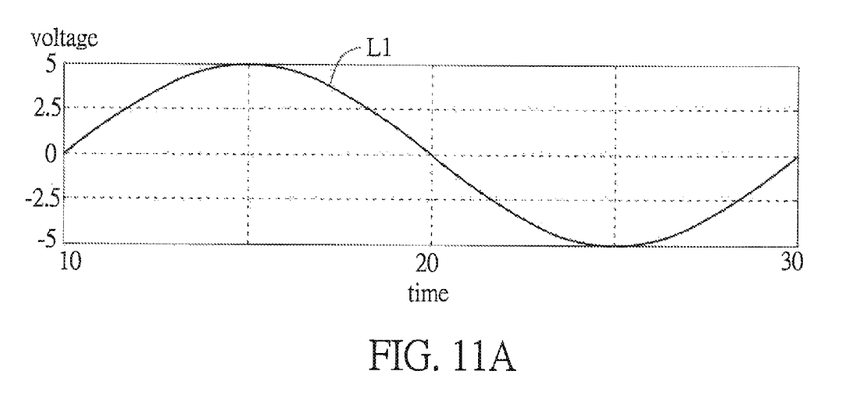
FIGS. 11A to 11C are schematic diagrams of the waveforms of the second sine-like wave signal and the sampling signal according to an embodiment of the invention.
Figure 11B:
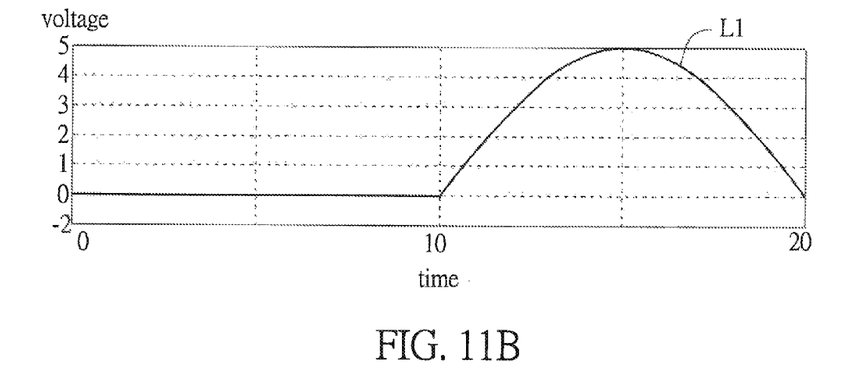
Figure 11C:
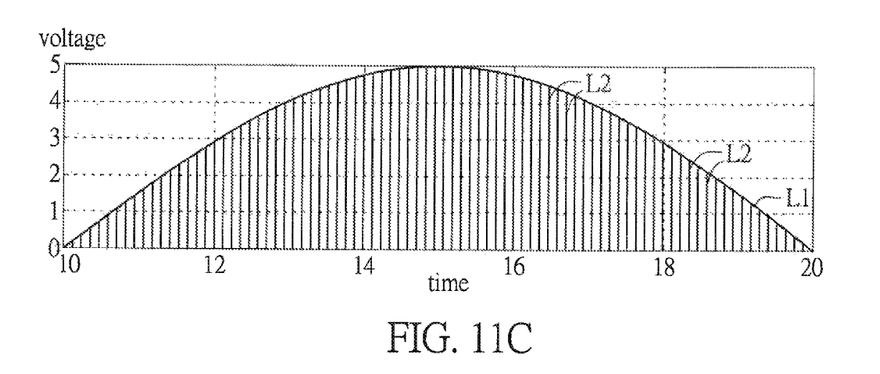

In the step S11, a voltage-transforming unit 231 receives and adjusts the first sine-like wave signal L to output a second sine-like wave signal L1. The voltage-transforming unit 231 is connected to a motor M of the fan A, and receives the first sine-like wave signal L generated by the motor M, and then adjusts the peak or amplitude of the first sine-like wave signal L to output the second sine-like wave signal L1. FIGS. 11A to 11C are schematic diagrams of the waveforms of the second sine-like wave signal and the sampling signal according to an embodiment of the invention, wherein the ordinate axis represents voltage while the abscissa axis represents time.

The voltage-transforming unit 231 is electrically connected to the motor M and the microcontroller 3. For example, the microcontroller 3 of this embodiment just receives the voltage of 0~5V, so the voltage-transforming unit 231 needs to output the voltage of 0~5V. In other words, the voltage-transforming unit 231 receives the first sine-like wave signal L and then adjusts the level and amplitude of the first sine-like wave signal L, so that the second sine-like wave signal L1 outputted by the voltage-transforming unit 231 has a positive half-cycle between 0V and 5V (as shown in FIG. 11B) for being received by the microcontroller 3. In other embodiments, the microcontrollers of different types can receive voltages of different levels, and for example, one of the microcontrollers can receive voltage of 0~7V.

Figure 12:
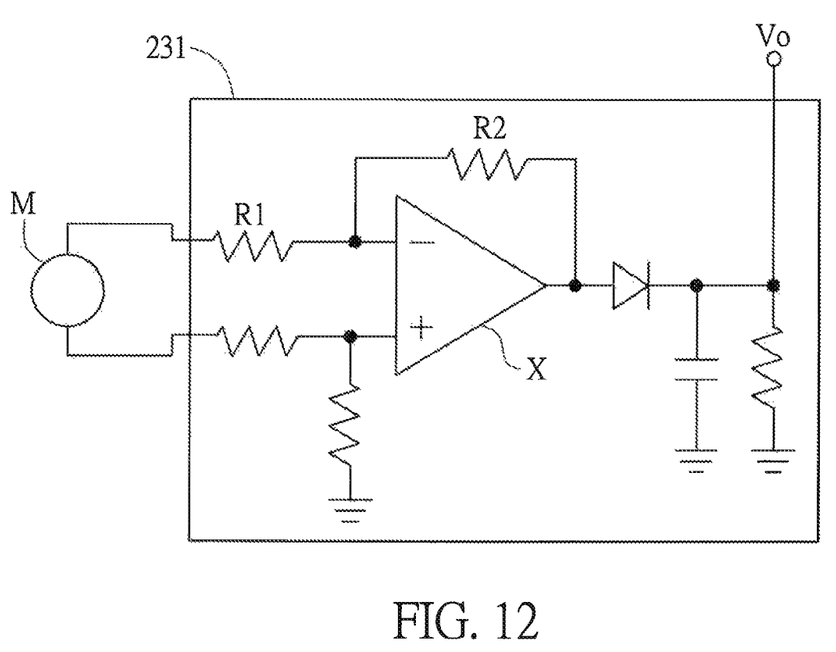
FIG. 12 is a schematic circuit diagram of a voltage-transforming urn according to an embodiment of the invention.

FIG. 12 is a schematic circuit diagram of a voltage-transforming unit according to an preferred embodiment of the invention. In FIG. 12, the voltage-transforming unit 231 includes a first resistance R1, a second resistance R2 and a comparator X. The first resistance R1 is electrically connected to the inverting input node of the comparator X, and the second resistance R2 is electrically connected to the inverting input node and output node of the comparator X. When the voltage-transforming unit 231 is connected to the motor M, the output voltage Vo of the voltage-transforming unit 231 is detected. Then, when the output voltage Vo is not within the range of 0~5V that the microcontroller 3 can receive, the values of the first and second resistances R1 and R2 are adjusted, so that the output voltage Vo outputted by the voltage-transforming unit 231 is between 0V and 5V.

In the step S12, an analog-to-digital converting (ADC) unit 31 generates a plurality of sampling signals L2 (as shown in FIG. 11C, and the number of which in FIG. 11C is just for example but not for limiting the invention) according to the second sine-like wave signal L1. The ADC unit 31 of the microcontroller 3 receives the second sine-like wave signal L1, and then generates a plurality of the sampling signals L2 according to the positive half-cycle of the second sine-like wave signal L1. The number of the sampling signals L2 is determined by the sampling frequency and the half-cycle Back-EMF frequency. Besides, the number of the sampling signals L2 is equal to the sampling frequency of the ADC unit 31 divided by the half-cycle Back-EMF frequency. For example, when the sampling frequency of the ADC unit 31 is 25 KHz and the half-cycle Back-EMF frequency is 50 Hz, the number of the sampling signals L2 is equal to 500 that is obtained by 25K divided by 50. Moreover, the sampling signals L2 are digital values of the Back-EMF of the motor M.

In the step S13, the ADC unit 31 stores the sampling signals L2 in a data table 32. The ADC unit 31 stores the sampling signals L2 in the data table 32 of the microcontroller 3. A larger number of the sampling signals L2 can make the fan's control more stable, but the number of the sampling signals L2 stored in the data table 32 is determined by the memory capacity of the microcontroller 3. When the memory capacity is larger, a larger number of the sampling signals L2 can be stored in the data table 32, and oppositely, when the memory capacity is smaller, a smaller number of the sampling signals L2 can be stored in the data table 32.

In the step S14, the waveform W is outputted according to the data table 32. In other words, by the cooperation with the data table 32, when the control circuit of the fan needs the Back-EMF of the motor as the control parameter, the control circuit can directly read out the sampling signals stored in the data table. Thereby, the read out is more effective and takes less time.

As shown in FIG. 5, a control system of a fan is further disclosed in the invention. The control system 2 includes a detection module 21, a control module 22 and a Back-EMF module 24. The detection module 21 detects a rotational speed S of a blade A and a rotor position P of the blade A. The control module 2 electrically connected to the detection module 21, and generates a control signal C according to the rotational speed S and a predetermined rotational speed D. The Back-EMF module 24 is electrically connected to the control module 22 and the detection module 21, receives the rotational speed S, the rotor position P and the control signal C to generate a Back-EMF waveform, and adjusts the phase of the Back-EMF waveform to output a switch control signal V.

The control system 2 further includes a waveform-generating module 23, which is electrically connected to the Back-EMF module 24 and outputs a waveform W to the Back-EMF module 24. The Back-EMF module 24 generates the Back-EMF waveform according to the rotational speed S, the rotor position P, the waveform W and the control signal C.

The control system 2 further includes a comparator 25, which is electrically connected to the Back-EMF module 24. The comparator 25 receives the switch control signal V and compares the switch control signal V and a triangle wave to output a switch signal I.

The detection module 21, the control module 22, the waveform-generating module 23, the Back-EMF module 24 and the comparator 25 have the same technical features as those in the above embodiments, and therefore they are not described here for concise purpose.

Besides, as shown in FIG. 10, the waveform-generating module 23a further includes a voltage-transforming unit 231 and a microcontroller 3.

As shown in FIG. 12, The voltage-transforming unit 231 has a first resistance R1, a second resistance R2 and a comparator X. The first resistance R1 is electrically connected to the inverting input node of the comparator 21, and the second resistance R2 is electrically connected to the inverting input node and output node of the comparator X. The voltage-transforming unit 231 outputs an output voltage Vo, and the values of the first and second resistances R1 and R2 can be adjusted to adjust the value of the output voltage Vo.

The microcontroller 3 is electrically connected to the voltage-transforming unit 231, and includes an analog-to-digital converting (ADC) unit 31 and a data table 32. The ADC unit 3 generates a plurality of sampling signals L2 according to the positive half-cycle of the second sine-like wave signal L1, and stores the sampling signals 12 in the data table 32.

The voltage-transforming unit 231, the microcontroller 3, the ADC unit 31 and the table 32 have the same technical features as those of the above embodiments, and therefore they are not described here for concise purpose.

In summary, according to the control method and control system of the fan of the invention, the Hall sensor of the detection module detects the rotational speed and rotor position of the blade, and then the rotational speed is compared with the predetermined rotational speed to generate the control signal for the increasing effect, decreasing effect or unchanged effect. Then, the Back-EMF module obtains a Back-EMF waveform according to the control signal, the rotational speed, the rotor position and the waveform, and adjusts the phase of the Back-EMF waveform to output a switch control signal. Besides, the comparator compares the switch control signal and a triangle wave to output the switch signal for switching the switch elements.

In comparison with the conventional art, the control method and control system of the fan according to the invention can keep the current driving circuit and architecture of the fan, and only the control method and course are changed. Thereby, the RMS current and average current of the fan can be decreased so that the fan's efficiency can be increased, the vibration amount and electric pressure can be reduced, the cost of the material and production can be decreased, and the lifecycle of the product can be extended.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A control method of a fan, comprising steps of:
   detecting a rotational speed of a blade and a rotor position of the blade;
   generating a control signal according to the rotational speed and a predetermined rotational speed;
   obtaining a Back-EMF waveform according to the control signal, the rotational speed, the rotor position and a waveform, wherein the waveform is derived from an induced electromotive force of a coil of a motor of the fan is measured by an oscilloscope and digitalized to be a prototype for the Back-EMF waveform;
   adjusting the phase of the Back-EMF waveform; and outputting a switch control signal where the switch control signal is used to control a switch for the blade,
wherein the motor generates a first sine-like wave signal, which is a Back-EMF of the motor, and the control method further comprises steps of:
  a voltage-transforming unit receiving and adjusting the first sine-like wave signal to output a second sine-like wave signal;
  an analog-to-digital converting unit generating a plurality of sampling signals according to the second sine-like wave signal;
  the analog-to-digital converting unit storing the sampling signals in a data table; and
  reading out the waveform according to the sampling signals from the data table.

2. The control method as recited in claim 1, wherein the rotational speed and the predetermined rotational speed are compared with each other to generate the control signal.

3. The control method as recited in claim 1, wherein the voltage-transforming unit has a first resistance and a second resistance.

4. The control method as recited in claim 3, further comprising a step of:
  adjusting the values of the first and second resistances according to an output voltage of the voltage-transforming unit.

5. The control method as recited in claim 1, wherein the sampling signals are generated according to the positive half-cycle of the second sine-like wave signal in the step of generating a plurality of sampling signals according to the second sine-like wave signal by the analog-to-digital converting unit.

6. The control method as recited in claim 1, wherein in the step of adjusting the phase of the Back-EMF waveform, the Back-EMF waveform is compared with a standard Back-EMF waveform so that the phase of the Back-EMF waveform is adjusted as the same as the phase of the standard Back-EMF waveform.

7. The control method as recited in claim 1, further comprising a step of:
  generating a switch signal according to the switch control signal and a triangle wave.

8. A control system of a fan, comprising:
  a detection module detecting a rotational speed of a blade and a rotor position of the blade;
  a control module electrically connected to the detection module and generating a control signal according to the rotational speed and a predetermined rotational speed;
  a Back-EMF module electrically connected to the control module and the detection module, receiving the rotational speed, the rotor position and the control signal to generate a Back-EMF waveform, and adjusting the phase of the Back-EMF waveform to output a switch control signal where the switch control signal is used to control a switch for the blade; and
  a waveform-generating module electrically connected to the Back-EMF module and outputting a waveform to the Back-EMF module, wherein the waveform is derived from an induced electromotive force of a coil of a motor of the fan is measured by an oscilloscope and digitalized to be a prototype for the Back-EMF waveform;
wherein the waveform-generating module comprises:
  a voltage-transforming unit receiving and adjusting a first sine-like wave signal generated by a motor, and outputting a second sine-like wave signal, wherein the first sine-like wave signal is a Back-EMF of the motor; and
  a microcontroller electrically connected to the voltage-transforming unit, including an analog-to-digital converting unit and a data table, wherein the analog-to-digital converting unit generates a plurality of sampling signals according to the second sine-like wave signal, and stores the sampling signals in the data table, and reading out the waveform according to the sampling signals.

9. The control system as recited in claim 8, wherein the voltage-transforming unit has a first resistance, a second resistance and a comparator, the first resistance is electrically connected to the inverting input node of the comparator, and the second resistance is electrically connected to the inverting input node and output node of the comparator.

10. The control system as recited in claim 8, wherein the analog-to-digital converting unit generates the sampling signals according to the positive half-cycle of the second sine-like wave signal.

11. The control system as recited in claim 8, wherein the voltage-transforming unit outputs an output voltage.

12. The control system as recited in claim 8, wherein the Back-EMF module generates the Back-EMF waveform according to the rotational speed, the rotor position, the waveform and the control signal.

13. The control system as recited in claim 8, further comprising:
  a comparator electrically connected to the Back-EMF module, and receiving the switch control signal and comparing the switch control signal and a triangle wave to output a switch signal.

* * * * *